United States Patent [19]

Allan et al.

[11] Patent Number: 4,925,161
[45] Date of Patent: May 15, 1990

[54] PROCESS FOR MOLDING DIRECTIONALLY-ORIENTATABLE MATERIAL USING SHEAR FORCE

[75] Inventors: Peter S. Allan, Iver; Michael J. Bevis, Uxbridge, both of England

[73] Assignee: National Research Development Corporation, London, England

[21] Appl. No.: 320,695

[22] Filed: Mar. 8, 1989

Related U.S. Application Data

[63] Continuation of Ser. No. 810,654, Dec. 18, 1985, abandoned.

[30] Foreign Application Priority Data

Dec. 21, 1984 [GB] United Kingdom ............... 8432335
May 20, 1985 [GB] United Kingdom ............... 8512708

[51] Int. Cl.$^5$ ............................................. B29C 45/00
[52] U.S. Cl. .................................... 264/69; 264/108; 264/328.8; 264/328.12; 425/573
[58] Field of Search ................ 264/23, 69, 40.5, 70, 264/40.6, 272.13, 328.1, 328.7, 328.8, 328.9, 328.12, 328.19, 108; 425/542, 555, 562, 563, 573

[56] References Cited

U.S. PATENT DOCUMENTS

| | | | |
|---|---|---|---|
| 3,523,147 | 8/1970 | Hold et al. ............................ | 264/23 |
| 3,847,525 | 11/1974 | Bielfeldt et al. ..................... | 425/555 |
| 3,981,838 | 9/1976 | Wilson ................................. | 264/211 |
| 4,029,454 | 6/1977 | Monnet ................................ | 425/562 |
| 4,098,772 | 7/1978 | Bonk et al. ......................... | 264/DIG. 77 |
| 4,124,308 | 11/1978 | Sokolow ............................. | 264/328.12 |
| 4,210,616 | 7/1980 | Eckardt et al. ..................... | 264/328.8 |
| 4,285,751 | 8/1981 | Feinberg et al. ................... | 264/176.1 |
| 4,288,398 | 9/1981 | Lemelson ........................... | 264/23 |
| 4,349,504 | 9/1982 | Kubat et al. ....................... | 264/328.17 |
| 4,429,061 | 1/1984 | Ide ....................................... | 264/54 |
| 4,481,324 | 11/1984 | Hall et al. ........................... | 264/213 |
| 4,542,054 | 9/1985 | Fillmann ............................. | 264/328.12 |

FOREIGN PATENT DOCUMENTS

| | | |
|---|---|---|
| 2205727 | 8/1973 | Fed. Rep. of Germany . |
| 2513594 | 10/1976 | Fed. Rep. of Germany . |
| 1009654 | 11/1965 | United Kingdom . |
| 1067100 | 5/1967 | United Kingdom . |
| 1175359 | 12/1969 | United Kingdom . |
| 1189141 | 4/1970 | United Kingdom . |
| 1213329 | 11/1970 | United Kingdom . |
| 1220213 | 1/1971 | United Kingdom . |
| 1463687 | 2/1977 | United Kingdom . |
| 2008023 | 5/1979 | United Kingdom . |
| 2085461 | 4/1982 | United Kingdom . |
| 2152938 | 8/1985 | United Kingdom . |

OTHER PUBLICATIONS

Allen et al., Plastics & Rubber International, Apr. 9, 1984, No. 2, London, Great Britain, pp. 33-37.
Menges et al., Modern Plastics International, Oct. 1981, pp. 38-39.

Primary Examiner—Jill L. Heitbrink
Attorney, Agent, or Firm—Jacobs & Jacobs

[57] ABSTRACT

A moulding process including:
  supplying molten, mouldable material to a mould cavity;
  subjecting at least a part of the supplied molten material to a shear force;
  causing the material to solidify while maintaining the shear force; and
  demoulding the moulded material.

17 Claims, 4 Drawing Sheets

PROCESS FOR MOLDING DIRECTIONALLY-ORIENTATABLE MATERIAL USING SHEAR FORCE

CROSS-REFERENCE

This is a continuation of Ser. No. 810,654 filed Dec. 18, 1985, now abandoned.

This invention relates to moulding processes and apparatus; and to moulded products produced therefrom. More particularly, this invention relates to moulding processes, especially injection moulding processes, and apparatus for producing oriented, moulded products, especially such products which have substantial volume but low surface area:volume ratio.

In this application, the following conventional abbreviations are used:
HDPE: high density polyethylene
TPX: polytrimethylpentene
PEEK: poly(aryletherketone)
PVF: polyvinylfluoride
PVdF: polyvinylidenedifluoride
LDPE: low density polyethylene
UHMWHDPE: ultrahigh molecular weight high density polyethylene
PTFE: polytetrafluoroethylene.

It is well known that the properties, notably mechanical properties such as tensile modulus and strength, of a thermoplastic material, especially a semicrystalline polymeric thermoplastic material, may be enhanced in a given direction by causing the material to be oriented in that direction. Many processes have now been devised for accomplishing this enhancement of mechanical properties either by forming the material in the mass ab initio in an oriented state or by subsequently imparting plastic strain to the solid material. All such processes provide, or seek to provide, oriented product of comparatively simple, and constant, cross-section: examples are fibre and film, including biaxially oriented film; and rod, tube and sheet stock. No comparable benefit has hitherto been available for thermoplastic materials moulded from the melt.

It is also well known that successfully moulding a thermoplastic, especially a semicrystalline and/or filled polymeric thermoplastic, material from the melt to a cavity of substantial volume but low surface area: volume ratio is fraught with difficulty because the cooling in the mass of material of low thermal conductivity is not easy to control and because, as a result, contraction occurs in the mass as solidification proceeds (which contraction can be exacerbated by crystallite formation). This can result in sinking of the mould surface and both macroporosity and microporosity throughout the moulded product.

Moreover in relation to conventional injection moulding processes, the molten mass of mouldable material is injected into the mould cavity from one feeding point and the subsequent packing force is also applied at this single point. For certain requirements of mould design, in particular moulds with long flow paths and moulds with variation in cavity wall thicknesses the single feed may be split so that the cavity can be filled satisfactorily from a number of feeds, or gating points. This practice results in the production of internal weld lines within the moulded part, at the positions where the various melt flow fronts from the multiple gate points meet. It has been shown that the presence of weld lines can cause undesirable discontinuities in the mechanical properties of the moulded article.

This invention seeks to provide a moulding technique by which the aforementioned important shortcomings in the moulding art can be overcome.

According, therefore, to one aspect of this invention there is provided a moulding process, which process comprises:
supplying molten, mouldable material to a mould cavity;
subjecting at least a part of the supplied molten material to a shear force;
causing the material to solidify while maintaining the shear force; and
demoulding the moulded material.

Preferably, the moulding process is an injection moulding process although it is to be understood that the moulding process of the invention is of general applicability to the moulding of molten, mouldable materials; for example, moulding by extrusion or by flow moulding.

This invention is of particular importance in relation to thick sectioned moulding; that is, mouldings in which the cross-sectional breadth is at least 5 mm; for example 40 mm or even up to 110 mm or more. However, the process of the invention can operate to advantage to form mouldings in which the cross-section breadth is 3 mm or less.

The moulding process of this invention is suitable for application to a mouldable material which comprises a polymer material: for example, an organic polymer material. The process may be applied to thermosettable polymer materials; for example, those formed in situ by reactive injection moulding (RIM) processes. It is preferred, however, that it is applied to thermoplastic polymer materials; these may be amorphous thermoplastic polymer materials such as LDPE, certain polyesters, free radical-polymerised polystyrene (crystal and HI grades), polymers of (meth)acrylate esters and poly(ether-sulphones). Alternatively, they may be, or become during moulding, semicrystalline polymer materials such as HDPE; polypropylene; TPX; nylon; certain aromatic polyesters; PEEK; PVC; PVF and PVdF. The moulding process of this invention is particularly suitable for application to polymer material, especially semicrystalline polymer material which can be effectively oriented; for example, a homo- or copolyolefin.

The moulding process of this invention is also particularly suitable for application to polymer material which comprises a liquid crystalline, preferably a thermotropic liquid crystalline, polymer; for example, liquid crystalline polyester, preferably a liquid crystalline aromatic polyester.

Blends of one or more of thermoplastic polymers, including one or more liquid crystalline polymers, may be moulded by the process of this invention.

The mouldable material used in the moulding process of this invention may comprise a filler; for example, a fibrous filler such as glass or carbon fibre, or a particulate organic or inorganic, preferably a solid, particulate, ceramic, inorganic filler; for example as platelets. Suitable such compositions are described in our GB 2085461B.

Preferred filled moulding compositions include glass fibre-filled polypropylene, PEEK and PES; and carbon fibre-filled PEEK and nylon.

At high loadings (for example, from 50 to 80% by volume of filler such as 55 to 60% by volume of filler)

the resulting moulded articles can be subjected to controlled heat treatment to convert them into sintered ceramic or metal products. Where a second, anisotropic, refractory filler is present (for example, a refractory fibrous filler) such products of the present invention will incorporate oriented fibres.

The mouldable material used in the moulding process of this invention may also comprise imbibed solvent, as is disclosed in our GB 2152938A.

In accordance with a preferred feature of this invention, the supplied molten material is subjected to a shear force by applying a periodic force to each of a plurality of regions of the molten material, there being a difference in the periodic forces applied to at least two different such regions effective to cause shear of the molten material at least between the two such regions.

While the process of the present invention may be effected with the periodic forces being in phase, provided that the frequency of one such force is an integral multiple of the other(s), it is desirable, in accordance with a preferred feature of the moulding process of this invention, that the periodic forces applied to at least two different regions of the molten material are of the same frequency; preferably, the periodic forces applied to at least two different regions of the molten material are out of phase, for example 180° out of phase, with each other.

The periodic force may be applied to a plurality of regions of the molten, mouldable material by dividing the supply of the material into a plurality of channels, for example two channels, and applying, by means of a piston variable reciprocatable in a cylinder communicating with the channel, a periodic force thereto. The force will be positive when the piston tends to compress the molten, mouldable material and negative when it tends to permit expansion of the molten, mouldable material. Where the supply is divided into two channels, a single cylinder-piston arrangement can communicate with both channels, as shown in FIG. 5 of the accompanying drawings. Preferably, however, each such channel has an independently variable cylinder-piston arrangement.

In accordance with a particularly preferred feature of this invention, forces substantially higher than those generally used in moulding processes may be employed to enhance the force to about 70,000 p.s.i., typically from 40,000 to 80,000 p.s.i.

In order to obtain a sufficient amount of heating from (and, indeed, to retain molecular orientation generated by) the work done by oscillating shear, the molten mouldable material must not be too fluid. It has been found that polymer materials having a melt flow index (MFI) of 4 to 10, preferably from 5 to 6, are very suitable: where the MFI is about 10 the molten polymer material tends to be too fluid to enable sufficient work to be done on it; where the MFI is very low it tends (for example, as is the case with UHMWHDPE and PTFE) to be too intractible.

The periodic force is applied for the minimum time consonant with obtaining the controlled cooling and degree of orientation required. This depends principally on the mould cavity dimensions and the nature of the mouldable composition. We have found that for glass filled polypropylene injected into a mould cavity forming a bar of 172 mm × 20 mm × 20 mm a time of no more than 400 seconds was very suitable. Suitable times may be determined by routine experimentation. Both the periodic force, and its frequency, can be continuously reduced by appropriate force-frequency-time microprocessor control means. The periodic forces are independently controlled by means of a microprocessor control system. A further requirement is that a mould cavity must be constructed with provision for the required number of feed points to suit the device.

It is preferred that, immediately prior to solidification of the molten, mouldable material, the periodic forces are applied in phase to provide auxiliary packing pressure to the mould cavity.

It is also preferred that sequences wherein the periodic forces are effective to cause shear may be interposed with sequences wherein the forces provide auxiliary packing pressure.

The invention also provides moulding apparatus which comprises a mould cavity and means for supplying molten, mouldable material thereto, and characterised by further comprising, interposed between the mould cavity and the supply means, means for applying a shear force to at least a part of any molten material supplied. Preferably, the means for applying a shear force including means for dividing the supplied molten, mouldable material into a plurality of regions of molten material; and means for applying periodic forces to at least two different such regions. It is preferred that the moulding apparatus of the invention comprises an injection moulding apparatus.

A still further important feature of the present invention is the control over residual stress, including low levels of residual stress, and the substantial freedom from sinking or voids found in the moulded articles prepared by the process of the present invention; for example, automotive or aerospace components.

The process provides for the introduction of high levels of stress in fibre reinforced materials in which the fibres act to preserve stress in the as-moulded component. The orientation of the fibres, and the composition of the composite material, determine the distribution of the locked-in or latent moulded-in stresses. The pattern of their release by the application of heat, and the resultant changes in part dimensions, are determined by the fibre orientations, bulk modulus and processing forces. This application of the process of the present invention with composite materials provides a way of controlling and preserving residual stresses in as-moulded components, and the subsequent application of heat provides for release of stresses and resultant definable change in shape.

This invention further provides a moulded article, such as an injection moulded article, preferably of a moulded organic thermoplastic polymer material, which comprises, in at least one portion thereof, an oriented, for example uniaxially oriented, core especially when prepared by the process of this invention; for example, of filled or unfilled polyethylene, polypropylene or nylon.

The invention will now be further illustrated, by way of example, with reference to the accompanying drawings, in which:

FIG. 1 represents a schematic, axially-sectioned side elevation of a conventional injection moulding machine;

FIGS. 2 to 4, inclusive, represent schematic plans, axially-sectioned along the flow path, of the manifold of this invention, made at different cycle times, and shown in situ interposed between the mould and the injection moulding machine;

Figure 1:
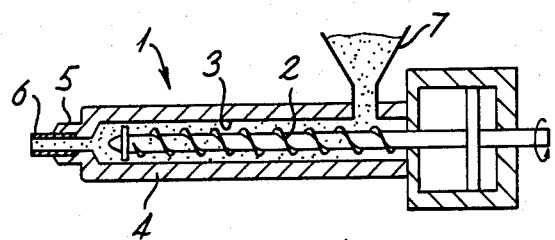

In the drawings, an injection moulding machine 1 comprises a drivable injection screw 2 mounted for rotation about, and for oscillation along, its axis within a substantially coaxially extending elongate cavity 3 of a cylindrical, heatable barrel 4. Downstream from the screw the cavity communicates within a nozzle 5 lined with bush 6, and upstream with a feed hopper 7 containing polymer feedstock.

The nozzle mates with manifold 8 and the bush communicates with an axially-symmetric, bifurcated channel 9, each branch of which leads upwardly into cylinders 10, 11 in each of which is opposably mounted an axially-slidable, drivable piston 12, 13, respectively. In turn, each cylinder communicates downstream with axially aligned twin nozzles 14, 15.

The twin nozzles mate with mould 16 (shown closed) which comprises a double sprued, double gated bar mould cavity 17, the spures 18, 19 communicating with the bushes 20, 21 of the twin nozzles, respectively.

In use, at start-up the mould tooling is assembled; demoulding agent is applied to the surfaces defining the mould cavity; the mould is then closed and brought to temperature, for example from 20° C. to 80° C. Granular polymer feedstock is fed from the feed hopper into the elongate cavity and heated by the cylindrical barrel heater (not shown). The molten polymer feedstock is further heated, plasticised, and rendered substantially homogeneous by rotation of the injection screw. When the molten polymer feedstock is determined to be of the right viscosity it is next injected, by rotation and downstream translation of the injection screw, into the mould cavity. The molten polymer feedstock enters the manifold and passes, successively, through cylinder 10; nozzle 14; sprue 18; mould cavity 17; sprue 19; nozzle 15 and into cylinder 11 where further transport is prevented by piston 13. When the mould cavity, sprues and manifold are filled with molten polymer feedstock the injection screw is stopped from rotating but is held at position to provide a constant packing force downstream thereof. It can thus be seen that the first function of the manifold is to split the single feed (ex nozzle 5) into the desired number of separate feeds. In the illustrated example the feed has been split into two identical channels.

Figure 3:
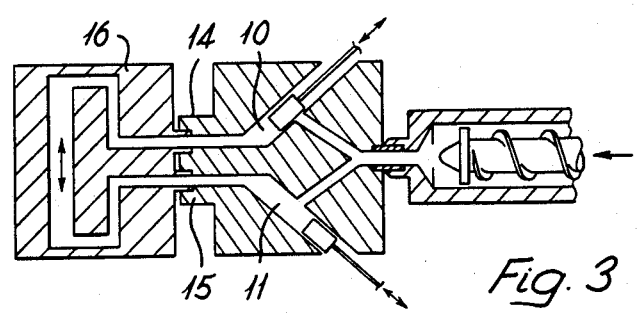
Figure 4:
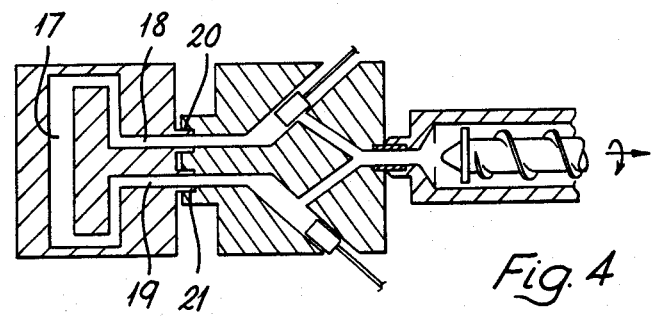
Figure 5:
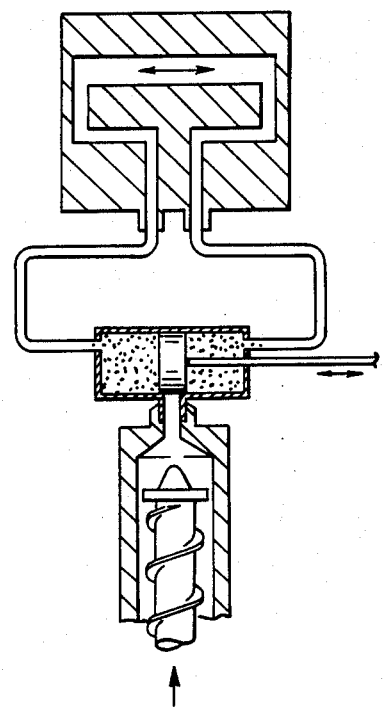
FIG. 5 represents a variant wherein a single source of applied force is provided.
Figure 6:
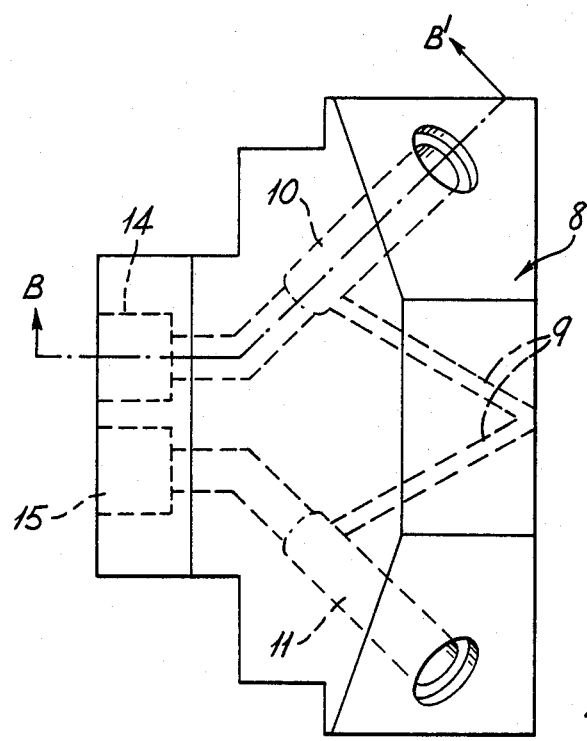
FIG. 6 represents, in greater detail, a plan of the manifold of this invention.

Pistons 12 and 13 are then reciprocated (see FIG. 3) at the same frequency, but out of phase with each other by 180°. This reciprocation maintains the molten polymer feedstock in the mould cavity, sprues and manifold under continual, oscillating shear which generates heat and which, by appropriate microprocessor control (not shown), enables the rate of cooling of the polymer feedstock to be controlled. In effect, the molten polymer feedstock in the mould cavity is continuously sheared by repetitive injection of molten polymer feedstock from cylinders 10 and 11. Shrinkage of the polymer feedstock on cooling is compensated for by further molten polymer feedstock necessarily being fed into the mould cavity from the manifold (and also from the elongate cavity) during the first reciprocation cycle.

At the end of the first reciprocation cycle (when a substantial bulk of the polymer feedstock in the mould cavity has solidified but while that in the gates is still molten) the pistons are, in a second reciprocation cycle, reciprocated in phase with each other to provide a packing force auxiliary to that of the injection screw until the polymer feedstock in the gate has solidified.

In another embodiment of this invention, it is found desirable, in order to effect a greater degree of control over the shearing of the molten polymer feedstock in the mould cavity and its rate of solidification that a part of the second reciprocation cycle can be performed during the first reciprocation cycle.

The mould is then removed from the manifold; the moulded polymer feedstock is demoulded; and the injection screw is translated upstream ready for the next injection moulding cycle.

(It may be desirable, in successive injection moulding cycles, to alternate injection of the molten polymer feedstock between cylinders 10 and 11 in order to prevent polymer feedstock becoming trapped in a nozzle and thereby becoming degraded.)

The following Examples illustrate the invention.

EXAMPLE 1

Figure 2:
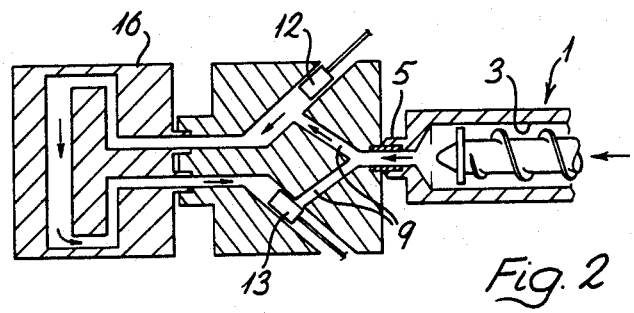

In this Example, the moulding line was arranged essentially as is shown in FIGS. 1 and 2 of the accompanying drawings. The mould was of a bar test specimen of rectangular cross-section; its dimensions were, in different specimens, 3×20×160 mm and 6×20×160 mm and the feedstock was, in different specimens, 20% and 30% by weight glass fibre reinforced polypropylene ("PROPATHENE" ex ICI Ltd.). Three classes of moulding process were utilised under otherwise optimised processing conditons:

(a) single end-gating without application of a periodic force;
(b) double end-gating without application of a periodic force; (both these latter being comparative moulding processes) and
(c) double end-gating with application of a periodic force in accordance with the present invention.

The room temperature tensile properties of the mouldings were determined using a 5 cm per minute cross-head speed. The results are shown in Table 1.

TABLE 1

| | Tensile strength (MPa) | | | |
|---|---|---|---|---|
| | 6 mm test specimen | | 3 mm test specimen | |
| Moulding process | 20% glass fibre | 30% glass fibre | 20% glass fibre | 30% glass fibre |
| a | 56.1 | 62.8 | 52.2 | 67.3 |
| b | 30.5 | 25.5 | 26.3 | 26.6 |
| c | 57.2 | 62.2 | 48.2 | 56.5 |

These results show that the tensile strength of double end-gated mouldings can be substantially improved by the application of a periodic force in accordance with the present invention. The weld line strengths in double end-gated mouldings produced without application of a periodic force are reduced to the weld line strengths of reinforced polypropylene (25 MPa). Processing in accordance with the present invention causes the strength of the 6 mm thick fibre reinforced mouldings to increase to that of the strength of the single gate mouldings without internal weld lines. A substantial increase in strength from less than 50% to more than 85% of the strength of weld line-free specimens was recorded for the 3 mm thick mouldings. These improvements were gained without increasing peak mould cavity force. (It is appropriate to use the term "weld line strengths" in relation to double end-gated mouldings produced without application of a periodic force because it is clear, both from microradiography and from the mode of failure of the test specimen, that the morphology of the weld region controls the strength of the test specimen.)

X-ray microradiographs of the weld regions showed a preferred fibre orientation parallel to the injection direction and normal to the plane of the weld when processing was effected in accordance with the present invention. Without the application of a periodic force in accordance with this invention the preferred fibre orientation at the weld was found to be normal to the injection direction.

Fibre length distributions in the moulded test specimens were measured and showed that no significant fibre degradation results from the processing in accordance with the present invention, beyond that which occurs during the initial melting and supplying of the composite mouldable material to the mould cavity.

EXAMPLE 2

Figure 8:
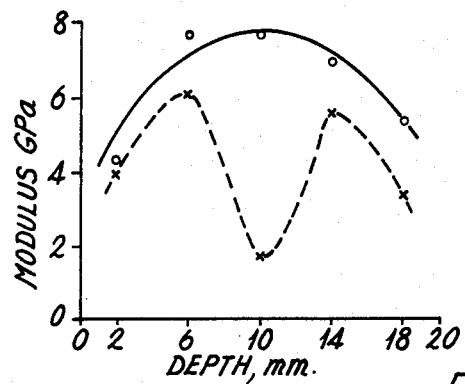
FIG. 8 represents the variation in tensile modulus of the moulding prepared in accordance with Example 2.

Examples 1 (a) and (c) were repeated with a mould of a bar test specimen of rectangular cross-section of dimension 20×20×170 mm; the feedstock was a 30% by weight glass fibre reinforced polypropylene ("PROPATHENE" ex ICI. Ltd.). The test specimens were then sectioned and the tensile moduli of the sections were determined. The results are shown in FIG. 8 in which the depth is measured from the surface containing the sprue(s) (at 0 mm) to the opposite surface (at 20 mm). The hatched curve represents the variation of modulus with depth of the comparative specimen; the continuous curve represents the variation of modulus with depth of the specimen prepared in accordance with this invention.

It will be seen that the averaged tensile modulus of the specimen prepared in accordance with this invention is increased, relative to the comparative specimen, by approximately 50%. It is to be particularly noted that the tensile modulus in the core of the specimen prepared in accordance with this invention is increased, relative to the comparative specimen, by approximately four times.

EXAMPLE 3

Figure 7:
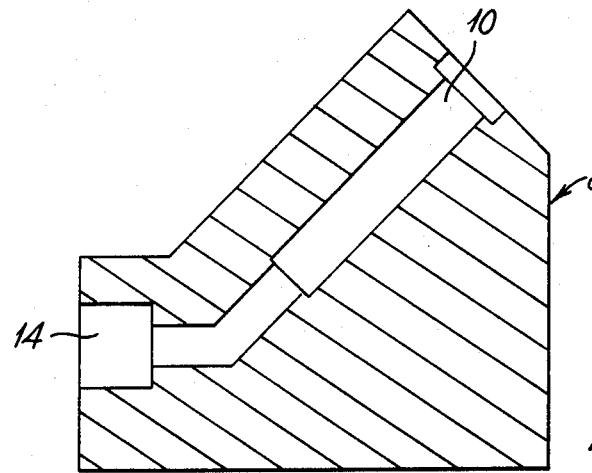
FIG. 7 represents a side elevation, sectioned along B—B', of FIG. 5.

Example 1 was repeated except that the mouldable material used was a thermotropic liquid crystal polymer prepared from ca. 70% p-acetoxybenzoic acid and 30% by weight acetoxynaphthalic acid. Results are shown in Table 2 and FIG. 7 of the accompanying drawings.

TABLE 2

Figure 9A:
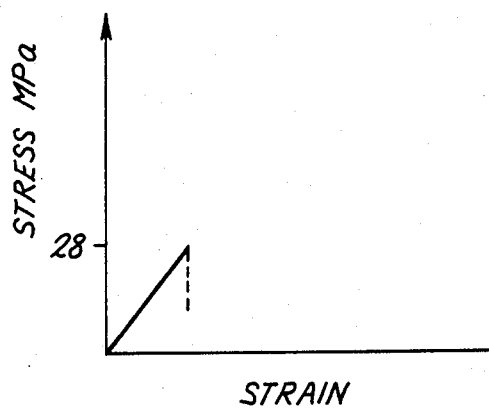
FIG. 9 represents stress-strain curves for the tensile testing of the moulding prepared in accordance with Example 3.
Figure 9B:
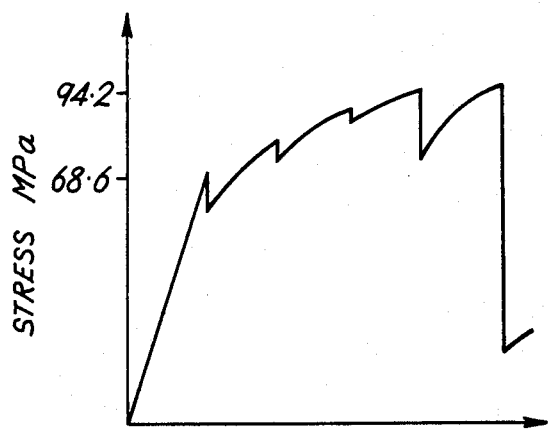

| Moulding process | Tensile strength (MPa) | Failure mode |
|---|---|---|
| a | 200 | |
| b | 28 | Brittle (see FIG. 9a) |
| c | 94 | Ductile (see FIG. 9b) |

EXAMPLE 4

Example 1(c) was repeated with a mould of a bar test specimen of rectangular cross-section 6×6×160 mm; the feedstock was unfilled HDPE ("RIGIDEX H050"; $\overline{M}_w$ approximately 100,000 ex BP Chemicals Ltd.). Application of a periodic force in accordance with the present invention resulted in the melt pressure oscillating about a mean pressure of 80 MPa and 100 MPa, respectively, at 50 oscillations per minute.

Results are shown in Table 3.

TABLE 3

| Mean cavity pressure (MPa) | Tensile modulus (GPa) |
|---|---|
| 80 | 2.26 |
| 100 | 3.94 |

It was found that the optimum tensile modulus obtained with a single end-gated mould was 1.1 GPa.

Successive removal of the outer layers of the specimen revealed a central core region in a solid coherent clear plug which usually failed in a brittle mode of fracture in a tensile test; which exhibited, in differential scanning thermogram, two melting points at 136° C. and 143° C., respectively, the latter being indicative of extended chain crystallites; and which had a tensile modulus of up to 11 GPa. Transmission electron micrographs of replicas from etched sections demonstrated, in this core, the presence of shish-kebab micromorphologies.

The process of the present invention allows control of the molten, mouldable material in the mould cavity such that the moulded articles prepared in accordance with this invention possess a number of advantages not obtainable by conventional moulding processes.

Thus, it is found that, by appropriate control of the process temperature, pressure, cooling and shear rates, the micromorphology of the resulting moulded material (and also the orientation of any filler which may be present) will provide an anisotropic enhancement of the mechanical properties of the moulded article. It is a particularly important feature of the process of this invention that, in a cross-section across the flow, the core is highly oriented while the surface of resulting moulded article is less oriented, tougher and more resistant to cracking or fibrillation.

It is also found that, by using the present invention, the adverse mechanical properties associated with the previously-mentioned weld lines and produced by multiple gating can be substantially ameliorated: the shearing produced by the process of the invention disturbs the weld line and restores the microstructure of the moulded article to that which would be expected from a single gated moulding. This is particularly the case in relation to fibre-filled and thermotropic liquid crystalline polymeric materials.

A further important feature of the present invention is that it provides a greater efficiency relative to a single feed oscillating packing unit. With the single feed oscillating unit the movement of polymeric material, which keeps the thinnest sections of the moulding molten while the thicker sections solidify, relies on the compression and decompression of the molten polymeric material remaining within the mould cavity. This can result in very high fluctuations of force within the cavity while the material is solidifying and can also cause over-packing of the material within the region of the feed point. With two (or more) feed zones the process of the invention can provide the necessary movement of material required to keep the sections of the moulding molten without having to resort to high forces to compress the melt. In fact the cavity force fluctuations can be greatly reduced from that of the single feed device and, therefore, allow the moulding to solidify under a much more even packing force than that experienced with a single feed oscillating packing force device.

A still further important feature of the present invention is the low level of residual stress; and the substantial freedom from sinkihg or voids found in the moulded articles prepared by the process of the present invention; for example, automotive or aerospace components.

What is claimed is:

1. A moulding process for moulding a solid product from molten material containing directionally-orientatable constituents in a mould having a mould cavity and at least one conduit communicating with said mould cavity, each said conduit entering said mould at a respective inlet, which comprises
    supplying said molten material to said inlet of said at least one conduit and subjecting said supplied molten material to a force sufficient to propel it through said at least one conduit into said mould cavity;
    providing in communication with said molten material in said mould at a plurality of spaced-apart regions of said molten material respective reciprocating means, each said reciprocating means comprising a member reciprocatable within and relative to a chamber, at least two of said regions being located such that molten material in said mould cavity lies between said at least two regions, and repetitively moving said molten material in said mould cavity in opposite directions by simultaneously reciprocating said reciprocatable members of said reciprocating means at said at least two regions at equal frequency but out of phase with each other to cause shear of said molten material within said mould cavity at least between said at least two regions; and
    causing the said material to solidify while said shear is maintained, whereby causing alignment of the said directionally-orientatable constituents in the said solid product.

2. A moulding process according to claim 1, in which at least one of said at least two regions at which said reciprocating means is provided is in proximity to one of said inlets to said mould.

3. A moulding process according to claim 2, in which said reciprocatable member and said chamber of said reciprocating means comprises a reciprocatable piston operating in a cylinder in communication with one of said conduits entering said mould at said inlet.

4. A moulding process according to claim 1, in which said molten material is supplied to said mould cavity by way of at least two said conduits, and in which said respective at least two inlets of said conduits are each proximate to a respective one of said at least two regions where said molten material is reciprocatably moved by said reciprocating means.

5. A moulding process according to claim 4, in which said reciprocatable member and said chamber of each of said reciprocating means proximate to said at least two inlets comprises a reciprocatable piston operating in a cylinder which branches off from one of said conduits which respectively enters the cavity at said at least two inlets.

6. A moulding process according to claim 1, in which said reciprocatable members of said reciprocating means at all of said spaced-apart regions are reciprocated at the same frequency.

7. A moulding process according to claim 1, in which said reciprocatable members of said reciprocating means at at least two of said spaced-apart regions are reciprocated out of phase with each other by 180°.

8. A moulding process according to claim 1, which is an injection moulding process.

9. A moulding process according to claim 1, wherein the mouldable material comprises a polymer material.

10. A moulding process according to claim 9, wherein the polymer material comprises a thermoplastic polymer.

11. A moulding process according to claim 10, wherein the thermoplastic polymer comprises a semi-crystalline polymer.

12. A moulding process according to claim 9, wherein the polymer material is a homo- or copolyolefin, or a blend thereof with one or more other polymers.

13. A moulding process according to claim 9, wherein the polymer material comprises a liquid crystalline polymer.

14. A moulding process according to claim 9, wherein the polymer material comprises a thermosetting polymer.

15. A moulding process according to claim 1, wherein the moldable material is filled.

16. A moulding process according to claim 15, in which the mouldable material is filled with fibres, said fibres constituting said directionally-orientatable constituents.

17. A moulding process according to claim 1, wherein said reciprocatable members of said reciprocating means at said at least two regions are reciprocated at a frequency of 50 oscillations per minute.

* * * * *

REEXAMINATION CERTIFICATE (2442nd)
United States Patent [19]

Allan et al.

[11] B1 4,925,161
[45] Certificate Issued Dec. 20, 1994

[54] PROCESS FOR MOLDING DIRECTIONALLY-ORIENTABLE MATERIAL USING SHEAR FORCE

[75] Inventors: Peter S. Allan, Iver; Michael J. Bevis, Uxbridge, both of England

[73] Assignee: British Technology Group Limited, London, England

Reexamination Request:
No. 90/003,291, Dec. 27, 1993

Reexamination Certificate for:
Patent No.: 4,925,161
Issued: May 15, 1990
Appl. No.: 320,695
Filed: Mar. 8, 1989

Related U.S. Application Data

[63] Continuation of Ser. No. 810,654, Dec. 18, 1985, abandoned.

[30] Foreign Application Priority Data

Dec. 21, 1984 [GB] United Kingdom ............... 8432335
May 20, 1985 [GB] United Kingdom ............... 8512708

[51] Int. Cl.$^5$ ............................................. B29C 45/00
[52] U.S. Cl. .................................. 264/69; 264/108; 264/328.8; 264/328.12; 425/573

[56] References Cited

U.S. PATENT DOCUMENTS

| | | | |
|---|---|---|---|
| 3,483,288 | 12/1969 | Paulson | 264/328.12 |
| 3,616,495 | 11/1971 | Lemelson | 425/155 |
| 4,029,454 | 6/1977 | Monnet | 425/130 |
| 4,120,922 | 10/1978 | Lemelson | 264/40.7 |
| 4,124,308 | 11/1978 | Sokolow | 366/77 |
| 4,285,751 | 8/1981 | Feinberg et al. | 156/242 |
| 4,288,398 | 9/1981 | Lemelson | 264/23 |
| 4,349,504 | 9/1982 | Kubat et al. | 264/328.17 |
| 4,429,061 | 1/1984 | Ide | 521/182 |
| 4,469,649 | 9/1984 | Ibar | 250/491.1 |

FOREIGN PATENT DOCUMENTS

1140340 11/1962 Germany.
2513594 10/1976 Germany.
2614213 10/1977 Germany.

OTHER PUBLICATIONS

Du Bois, J. H., et al., *Plastics Mold Engineering*, revised ed., pp. 438–451 (1965).

J. P. Ibar, "Instability in the Rubbery State Revealed by D.S.C. of Rheomolded ® Polystyrene Samples", *Polymer Communications*, vol. 24, pp. 331–335 (1983).

J. P. Ibar, "Rheomolding: A New Process to Mold Polymeric Material", *Polymer-Plastic Technology Engineering*, vol. 17, No. 1, pp. 11–44 (1981).

*Shock and Vibration Handbook*, 2 ed., edited by Harris, C. M., and Crede, C. E., pp. 33–35 (1976).

Allan, P., et al., "Producing Void-Free Thick Section Thermoplastic and Fiber Reinforced Thermoplastic Mouldings", *Plastics & Rubber International*, vol. 9, No. 2, pp. 33–37 (Apr. 1984).

*Primary Examiner*—Jill L. Heitbrink

[57] ABSTRACT

A moulding process including:
supplying molten, mouldable material to a mould cavity;
subjecting at least a part of the supplied molten material to a shear force;
causing the material to solidify while maintaining the shear force; and
demoulding the moulded material.

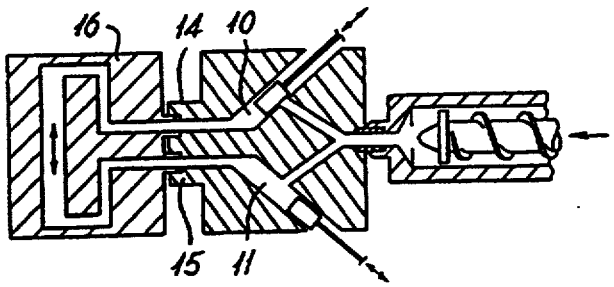

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-17 is confirmed.

* * * * *